(No Model.)
J. W. SCHOAF.
AXLE LUBRICATOR.
No. 493,121. Patented Mar. 7, 1893.
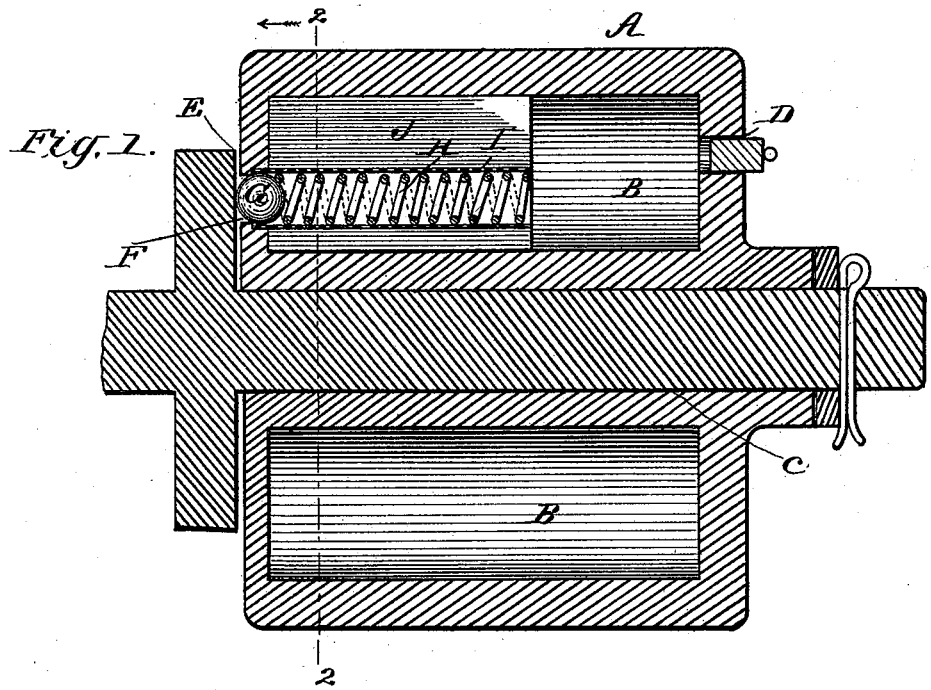
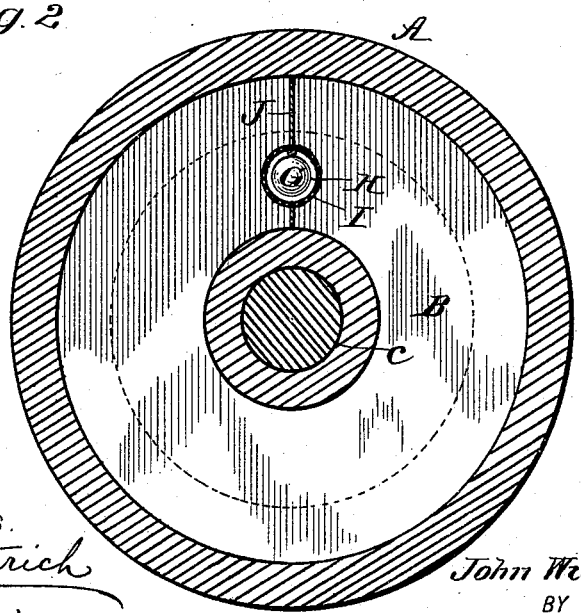
WITNESSES:
Fred J. Dieterich
P. B. Turpin.
INVENTOR:
John William Schoaf
BY Munn & Co.
ATTORNEYS

UNITED STATES PATENT OFFICE.

JOHN WILLIAM SCHOAF, OF McKEESPORT, PENNSYLVANIA.

AXLE-LUBRICATOR.

SPECIFICATION forming part of Letters Patent No. 493,121, dated March 7, 1893.

Application filed May 5, 1892. Serial No. 431,958. (No model.)

*To all whom it may concern:*

Be it known that I, JOHN WILLIAM SCHOAF, residing at McKeesport, in the county of Allegheny and State of Pennsylvania, have invented a new and useful Hub-Oiler, of which the following is a specification.

My invention is a useful hub oiler or lubricator and consists in the novel construction and combinations of parts hereinafter fully described and pointed out in the claims.

In the drawings—Figure 1 is a section of a part of a wheel and axle provided with my invention. Fig. 2 is a transverse section on about line 2—2, Fig. 1.

The invention is shown as applied to a car wheel supported to revolve on its axle but manifestly the invention is not so limited in its application, but may be embodied in axles having fixed wheels and in other connections as will be manifest to those skilled in this art.

In the construction shown the wheel A has its hub hollowed out forming a chamber or oil receptacle B surrounding the central tubular portion C. Oil may be supplied to this chamber in any suitable way, an inlet D being preferably provided for such purpose. Manifestly this inlet D may be closed in any desired manner. At its end which moves next to the contact surface E there is provided an outlet F, from the oil chamber. Such outlet F is controlled by a valve G, which is spring pressed or actuated into closed position. In its closed position the valve or a part thereof projects beyond the end or face of the wheel in position to be engaged by the contact surface E where the end of the wheel abuts the same, the valve being so opened to permit the escape of oil to lubricate the bearing between the hub and surface E. The oil so supplied will also run down to lubricate the spindle. In the construction shown the contact surface E is provided by the shoulder on the spindle but in the case where the wheel is fixed to the axle it may be differently provided without departing from the invention.

As shown and preferred the valve G is a ball and is pressed to its seat from within by a spring H operating in a perforated cylinder I projecting within the oil chamber. This cylinder has a double function as it operates as a holder for the spring and also limits the amount of oil passing to the outlet opening and thus operates to prevent waste. A stop plate J extends between this cylinder I and the outer wall of the oil chamber and operates in practice to carry the oil up and keep it in contact with the perforated cylinder until the latter has reached its highest point. In this connection it will be seen that the perforated tube is arranged near to or against the central tube so that such tube and the plate J form practically a partition to carry the oil around with the wheel and keep it in contact with the perforated tube. It will be seen that the valve is supported and adapted to turn or roll so that when it abuts the contact surface it will roll or turn to avoid undue wear by friction. When such valve is not in engagement with the contact surface it will be held closed by its actuating spring.

It will be understood that I do not desire to limit myself to such wheels as are used upon vehicles or turn upon axles but desire to be protected as well in the application of the invention to pulleys and analogous devices.

Having thus described my invention, what I claim as new, and desire to secure by Letters Patent, is—

1. A wheel hub having an oil cavity and provided with an outlet opening therefrom and with a valve controlling and normally seated to close said opening and provided with a projection or portion arranged for engagement by a contact surface, whereby said valve may be moved by such engagement off its seat to permit the discharging of oil through the outlet opening substantially as and for the purposes set forth.

2. A wheel hub having an oil cavity or reservoir provided at the end of the hub with an outlet opening a valve controlling said opening and normally seated to close the same, combined with a contact surface at the end of the hub and arranged and adapted to move said valve off its seat to permit the escape of oil substantially as set forth.

3. A wheel hub having an oil cavity and provided with an outlet opening therefrom and a perforated tube in said cavity surrounding the outlet opening and the spring pressed valve normally seated to close said opening and provided with a projecting portion for engagement by a contact surface whereby the valve may be moved from its seat to permit the escape of oil, substantially as set forth.

4. A wheel hub having an oil cavity and provided with an outlet opening leading therefrom and a valve controlling said opening, a perforated tube and a stop plate extending from said tube within said oil cavity to the outer wall of the oil cavity, substantially as and for the purposes set forth.

5. The combination with the wheel hub having an oil cavity and provided with an outlet opening leading therefrom, of the perforated tube surrounding said opening and projecting into the oil cavity, the valve fitted in said tube and arranged to close the outlet opening and having a portion projecting beyond the latter for engagement by the contact surface and the spring for actuating said valve, such spring being also fitted in the perforated tube, substantially as set forth.

6. In a wheel, the combination of the hub having the oil cavity B and the outlet opening F leading therefrom, the perforated tube or cylinder I, in said cavity and surrounding the outlet opening the ball valve G and spring H and the stop plate J extending from said tube to the wall of the oil cavity, substantially as set forth.

7. In a wheel substantially as described, the combination of the hub having cavity B and outlet F, the perforated tube or cylinder projected from said outlet into the oil cavity and the stop plate J, extended inward from the outer wall of the oil cavity, substantially as set forth.

8. The hub oiler substantially as described, having its hub provided with an oil cavity having an outlet opening, the perforated tube I in said cavity, the ball valve in said tube, the spring for actuating said valve and the stop plate J extended inward from the wall of the oil cavity, substantially as set forth.

9. In an oiler substantially as described, a hub having an oil cavity and provided with an outlet or discharge from said cavity opening out of the inner end of the hub, and a valve normally seated to close said outlet and having a projecting portion for engagement by a contact surface, in combination with a contact surface arranged at the end of the hub and adapted to move the valve inward when engaged thereby all substantially as and for the purposes set forth.

10. A hub having an oil cavity, an oil discharge opening and a plate arranged in the oil cavity extended longitudinally in the direction of the axis of the hub and projected inward from the outer wall of the cavity approximately to the line of the oil discharge opening substantially as set forth.

JOHN WILLIAM SCHOAF.

Witnesses:
JAS. H. WYANT,
ROBT. C. SNOWDEN.